US006997497B2

(12) United States Patent
Sagi et al.

(10) Patent No.: US 6,997,497 B2
(45) Date of Patent: Feb. 14, 2006

(54) CARGO SYSTEM

(75) Inventors: Yaron Sagi, Merchavia (IL); Israel Bloch, Nahalal (IL)

(73) Assignee: Pik 4 Trip Ltd., Nahalal (IL)

( * ) Notice: Subject to any disclaimer, the term of this patent is extended or adjusted under 35 U.S.C. 154(b) by 0 days.

(21) Appl. No.: 10/800,724

(22) Filed: Mar. 16, 2004

(65) Prior Publication Data

US 2005/0206181 A1  Sep. 22, 2005

(51) Int. Cl.
*B60N 3/12* (2006.01)
(52) U.S. Cl. ............... 296/37.7; 296/163; 224/400; 224/309
(58) Field of Classification Search .......... 296/37.7, 296/163, 98; 220/4.12, 560.11; 224/400, 224/309, 319
See application file for complete search history.

(56) References Cited

U.S. PATENT DOCUMENTS

| 3,596,977 A | * | 8/1971 | Bunger ............... 296/163 |
| 3,743,345 A | * | 7/1973 | Eckman et al. ........ 296/163 |
| 4,010,973 A | * | 3/1977 | Heinrich ............. 296/163 |
| 5,032,957 A | * | 7/1991 | Canfield ............. 362/133 |
| 5,230,545 A | * | 7/1993 | Huang et al. ........ 296/163 |
| 6,012,759 A | * | 1/2000 | Adamek .............. 296/98 |
| 6,595,382 B1 | * | 7/2003 | Ettlinger ............ 220/560.11 |

* cited by examiner

Primary Examiner—Lori L. Coletta
(74) Attorney, Agent, or Firm—Mark M. Friedman

(57) ABSTRACT

A cargo system includes a plurality of rigidly connected compartments adapted to mount on the roof of a vehicle. The plurality of compartments includes a first compartment suitable for mounting a retractable awning and a second compartment suitable for storing cargo. The first and second compartments each include a flooring and a sidewall wherein the first compartment is rigidly connected to the second compartment by at least one of the flooring and the sidewall. One of the plurality of compartments includes a liquid container, at least a portion of the container being suspended in the compartment. The liquid container includes a tube suitable for passing liquid that emerges from the cargo system. In addition, a light assembly is operatively associated with the cargo system. The light assembly includes an electrical conductor suitable for providing power to the light assembly, the conductor emerging from the cargo system.

18 Claims, 3 Drawing Sheets

CARGO SYSTEM

FIELD OF THE INVENTION

The present invention relates to a cargo system that mounts on the roof of a vehicle and stores cargo and a retractable awning.

BACKGROUND OF THE INVENTION

To ensure a pleasurable trip in a vehicle it is desirable to keep passenger space relatively uncluttered with suitcases containing clothing or boxes containing food, herein cargo. While binding cargo to a rack attached to the vehicle roof reduces passenger compartment clutter, the binding may loosen at highway speeds, resulting in cargo spillage, a significant highway hazard. Further, cargo improperly loaded on the rack increases vehicle wind resistance and, particularly in heavy crosswinds, may contribute to vehicle instability and road accidents.

Roof-mounted containers that at least partially enclose cargo in an aerodynamically efficient manner, herein cargo containers, allow vehicle stability and safe transport of cargo while reducing passenger compartment clutter. As used herein an aerodynamically efficient cargo container refers to a container designed to reduce wind resistance while the vehicle is in motion, for example having curved and/or slanted portions.

A cargo container provided in conjunction with a utility item that can be used on the trip, for example a spotlight to aid in unloading the cargo at night, is known. Thule Company at Internet address www.thule.com shows a cargo container and light assembly that mount separately on the vehicle roof but, because the container and light are not joined, they fail to use the roof space efficiently.

Another desirable utility item for use on a trip is an awning that extends from a housing when the vehicle is parked, providing shade from the sun or protection against rain. Baka, G. J., in U.S. Pat. No. 5,558,145, teaches a roof-mountable awning that stores in the vehicle during transport, thereby increasing vehicle clutter. If the awning were suitably secured to die roof for transport, it would prevent the simultaneous attachment of a roof-mounted cargo container, resulting in cargo storage in the vehicle and passenger compartment clutter.

SUMMARY OF THE INVENTION

In an aspect of an embodiment of the present invention, a cargo container includes a plurality of rigidly connected compartments, herein a cargo system, adapted to mount on a roof of a vehicle, the compartments including one first compartment suitable for mounting a retractable awning and one second compartment suitable for storing cargo. As used herein, rigidly connected compartments refer to two or more compartments that are connected to one another by one or more relatively rigid components of the respective compartments, for example a sidewall of a first compartment to a sidewall of a second compartment or a flooring of a first compartment to a flooring of a second compartment.

In an aspect of an embodiment of the present invention, a cargo system includes a first compartment having a liquid container suspended therein, the space around the suspended container serving to insulate liquid in the container from the environmental temperature external to the cargo system. In an exemplary embodiment the liquid container includes a first tube suitable for putting liquid into the container and, optionally, a second tube suitable for dispensing liquid from the container, the first and second tubes emerging from the cargo system to allow access to the container from outside the cargo system. In an exemplary embodiment the cargo system includes a second compartment rigidly attached to the first compartment.

Optionally, a relatively rigid access panel is operatively associated the first and/or second compartments to protect the cargo contained therein. In an exemplary embodiment, the first compartment is spaced a distance from the second compartment, thereby defining a third compartment there between. The third compartment, for example, suitable for carrying suitcases.

Optionally, the cargo system includes one light assembly operatively associated with one of the first, second and third compartments, the light assembly providing light external to and/or internal to the cargo system compartments. In an exemplary embodiment the lighting system includes an electrical conductor that emerges from the cargo system so that the lighting system can be easily connected to an external power source.

BRIEF DESCRIPTION OF THE DRAWINGS

Exemplary non-limiting embodiments of the invention are described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DESCRIPTION OF EXEMPLARY EMBODIMENTS

Cargo System Overview

Figure 1:
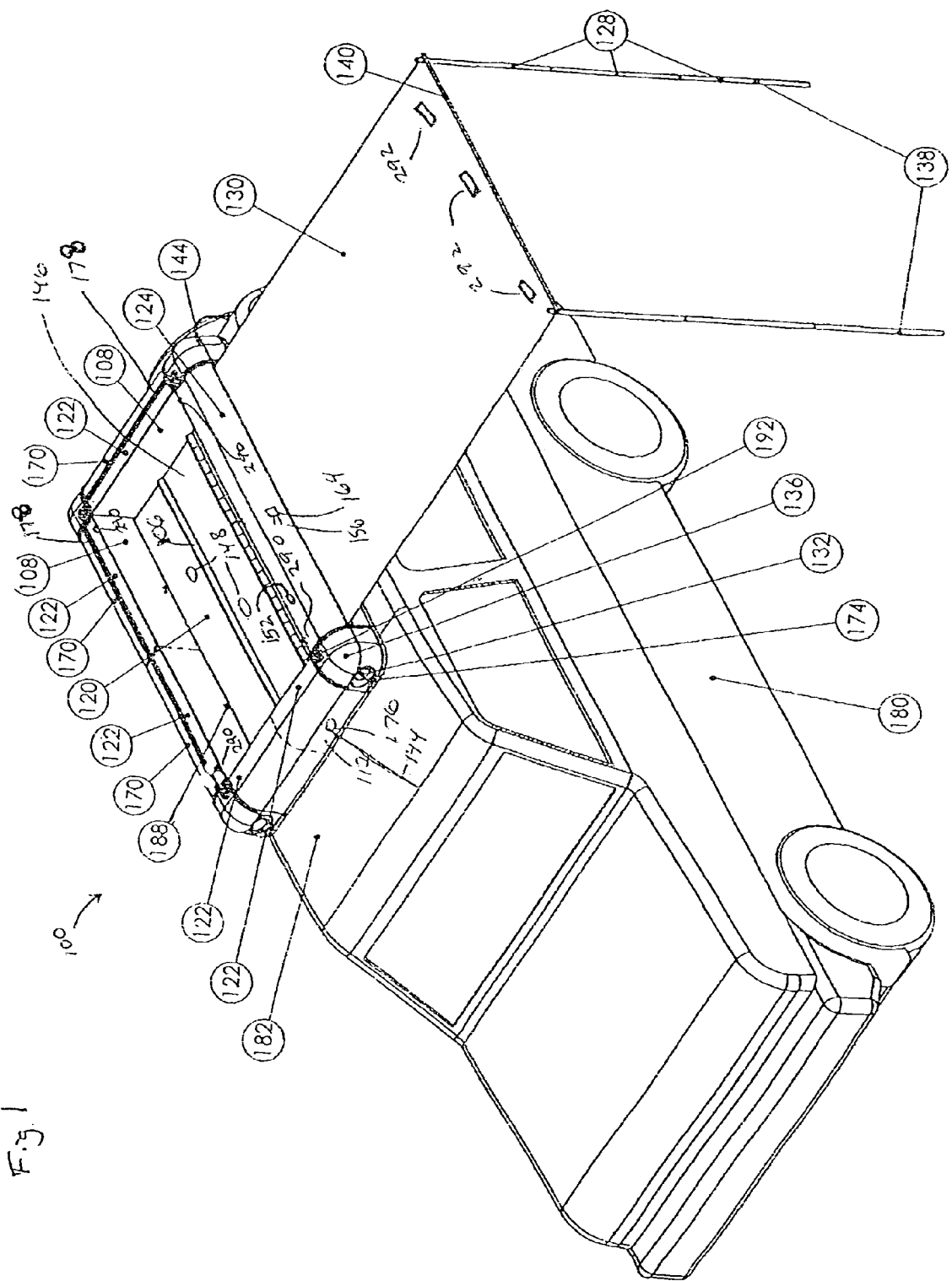
FIG. 1 is a top view of a cargo system mounted on a vehicle, in accordance with an embodiment of the present invention.
Figure 2:
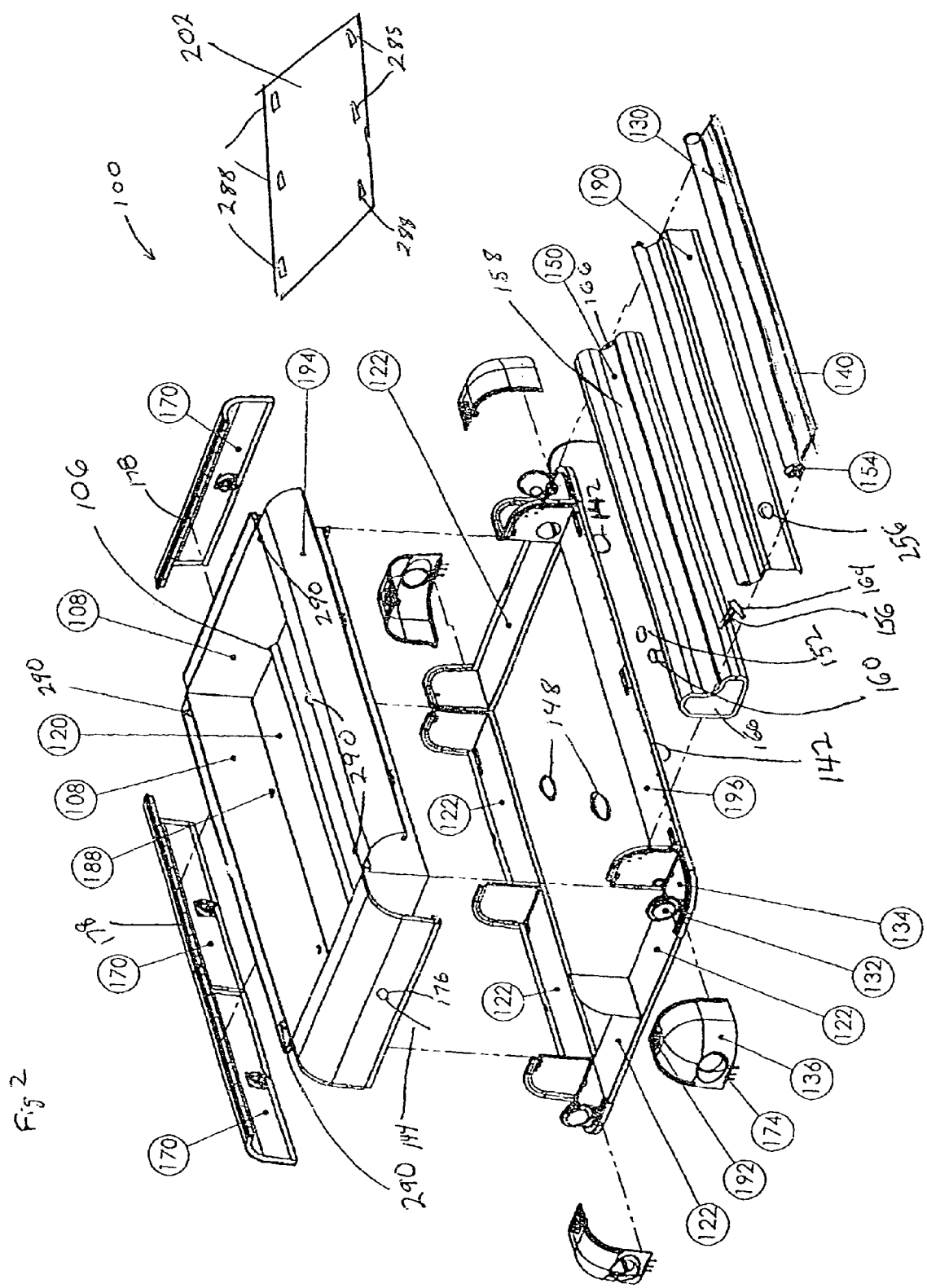
FIG. 2 is a partially exploded view of the cargo system of FIG. 1, in accordance with an embodiment of the present invention.

FIGS. 1 and 2 are top and exploded views, respectively of a cargo system 100, according to an exemplary embodiment of the invention. Cargo system 100 is adapted to mount on a roof 182 of a vehicle 180 and includes cargo compartments 122 and an awning compartment 124 each having relatively rigid floorings 196 and relatively rigid sidewalls 108. In an exemplary embodiment, compartments 120 and 122 and are rigidly connected to each other, for example by respective floorings 196 and/or one or more sidewalls 108.

Figure 3:
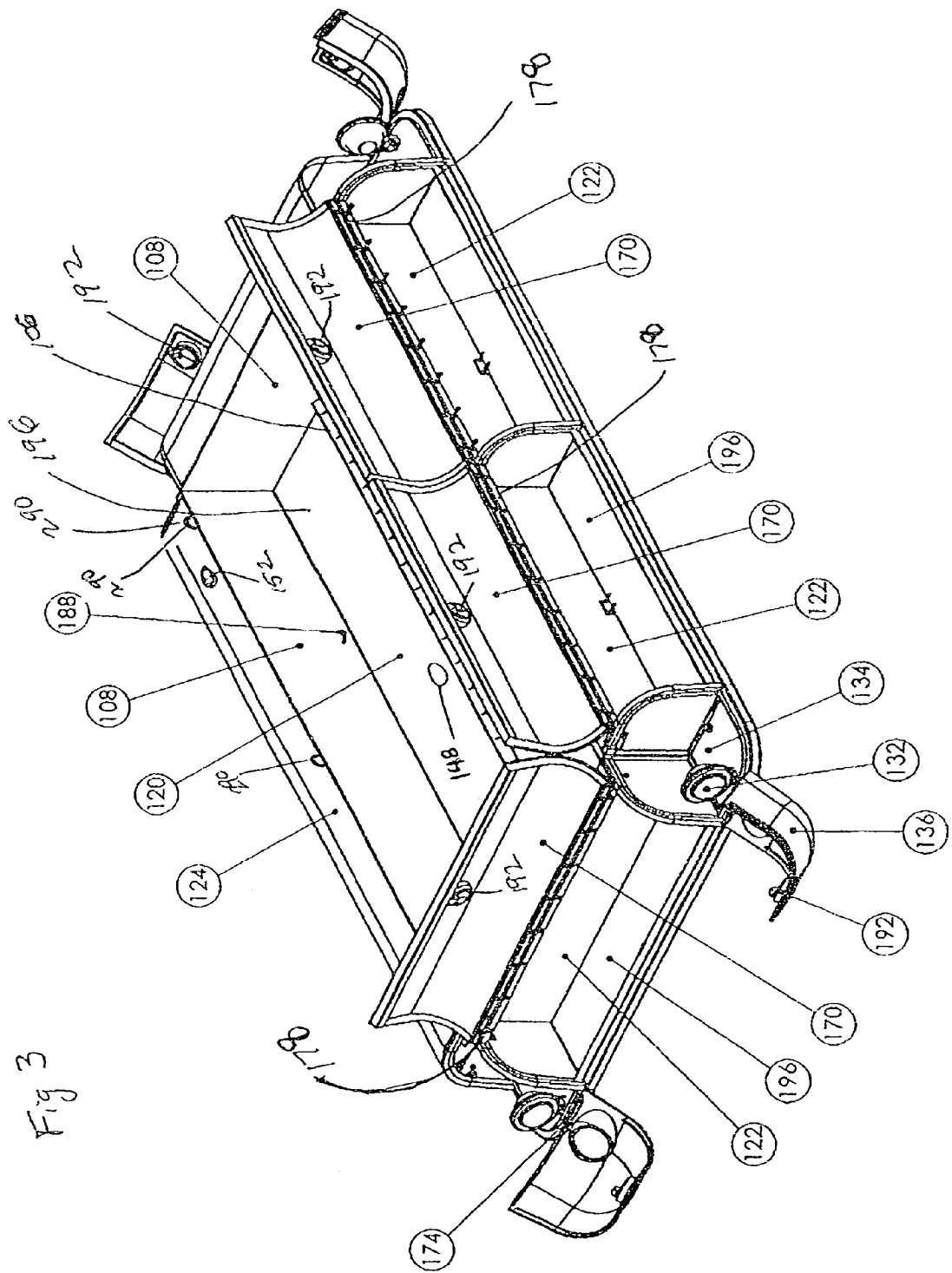
FIG. 3 is an internal perspective view of the cargo system of FIG. 1, in accordance with an embodiment of the present invention.

In an exemplary embodiment, relatively rigid access panels 170, shown in the open position in FIG. 3 are movably attached with hinges 178 to sidewalls 108 and/or floorings 196 of compartments 122 and 124. Access panels 170 typically include latches 192 to maintain access panels 170 closed with respect to their respective compartments 122 and 124. Optionally, each latch 192 includes a lock, for example, to prevent cargo theft and/or a lock receptacle (not shown), suitable to receive a lock, for example a hasp lock.

Compartments 122 are typically spaced a distance from compartment 124 to define a cargo storage compartment 120 suitable for storing cargo, the cargo being taller than sidewalls 108, for example suitcases. In an exemplary embodiment, cargo system 100 is designed for aerodynamic efficiency for example with compartments 120, 122 and 124 and their respective access panels 170 being of a shape and/or height that reduces wind resistance while vehicle 180 is in motion.

In an exemplary embodiment, cargo system 100 is attached to roof 182, for example using mountings and/or bolts (not shown) that project from compartments 120, 122 and/or 124 and attach to roof 182. Alternatively or additionally, cargo system 100 is strapped to roof 182 using a binding system of straps, rope, clips (not shown) and/or any of the many known suitable binding systems.

In an exemplary embodiment, flooring 196 includes spacer legs 142 that provide a space between cargo system 100 and vehicle roof 182 thereby preventing cargo system 100 from damaging roof 182. Spacer legs 142 are typically manufactured from a shock absorbent rubber to reduce noise that may occur as a result of relative motion between system 100 and roof 182.

Defined Cargo Compartment

In an exemplarity embodiment, defined cargo compartment 120 includes one or more cord receivers 188 that receive cord (not shown) to secure cargo in defined storage compartment 120. To prevent damage to flooring 196 by cargo stored in compartment 120, compartment 120 includes a protection strip 106 comprising rubber strips attached to flooring 196 or a raised portion of flooring 196. To allow drainage of water, for example rainwater that collects in compartment 120, flooring 196 has one or more drains 148, thereby allowing water to drain through drains 148 and pass through the space created by spacer legs 142 between floor 196 and roof 182. Additionally or alternatively, flooring 196 may be fashioned from a mesh or material having multiple perforations for drainage purposes.

In an alternative embodiment, flooring 196 is present under compartments 120 and 124, but absent from compartment 120, so that cargo stored in compartment 120 is mounted on roof 182 and surrounded by sidewalls 108. In the absence of flooring, roof 182 is provided with protection strips (not shown) to protect roof 182 from damage by cargo stored in compartment 120.

As shown in FIG. 2, cargo compartment 120 includes an optional cover 202 having grommets 288 that attach to hooks 290 along sidewall 108 thereby keeping compartment 120 free of dirt, rain and snow. Alternatively, cover 202 is attached to container 100 with appropriately placed snaps, clips or Velcro (not shown). In one embodiment, covering 202 comprises an elastic material that covers cargo contained below sidewalls 108 and stretches appropriately to cover cargo that protrudes above sidewalls 108.

Awning

FIG. 2 shows an awning 130 attached to a roller assembly 154 at a first end thereof and to a header bar 140 at a second end thereof. FIG. 1 shows awning 130 in use, extending out of an awning housing 124 with header bar 140 mounted on upright poles 138 so that awning 130 provides shade from the sun or protection against rain. Roller assembly 154 is typically spring-loaded in order to maintain tautness in awning 130 in the extended out position from between an access panel 194 and a base panel 190. Access panel 194 is typically connected to sidewall 108 and/or flooring 196 with hinges 178 so that panel 194 swings open to allow access to awning compartment 124.

When not in use, awning 130 retracts into housing 124 and multiple sections 128 of upright poles 138 disconnect, telescope and/or fold for storage in compartments 120, 122 and/or 124. Alternatively or additionally, while vehicle 180 is in motion, awning 130 extends over cargo container 100 to cover compartment 120 and attaches with grommets 292 to hooks 290 around compartment 120. Roller assembly 154 maintains tautness in awning 130 while covering compartment 120 having cargo contained below sidewalls 108 or cargo that protrudes above sidewalls 108.

Liquid Container

In an exemplary embodiment, compartment 124 includes a liquid container 150 having a suspended portion 158 with respect to compartment 124, the space around portion 158 serving to insulate liquid stored in container 150 from changes in temperature that occur in the environment external to container 100. Alternatively or additionally, container 151) includes insulating material (not shown) that at least partially surrounds container 150.

In an exemplary embodiment, container 150 has a connecting portion 166 that connects to compartment 124 and a filling tube 160 through which container 150 is filled with liquid. In the illustrated embodiment, tube 160 includes a cap 152 to prevent spillage and/or contamination of liquid contained in container 150. Filling tube 160 typically emerges from access panel 194 through a filling tube opening 254, allowing an operator to fill container 150 without opening compartment 124.

To dispense liquid from container 150, container 150 is provided with a dispenser tube 156 having a flow control 164. Dispenser tube 156 and flow control 164 typically emerge from access panel 194 through a dispenser tube opening 256, allowing an operator to dispense liquid from container 150 without opening compartment 124. While container 150 is shown associated with compartment 124, container 150 additionally or alternatively, is associated with compartments 120, 122 and/or 124. Optionally container 150 is a bag or bladder having a flexible wall allowing it to have a variable internal volume. As bag container 150 is emptied of liquid, it collapses, thus taking up less room in compartments 120, 122 and/or 124.

Light Assemblies

In an exemplary embodiment, cargo system 100 includes corner compartments 134 each having a corner access panel 136 moveably attached thereto with hinge 174. Access panel 136 typically includes a latch 162 to keep access panel 136 in the closed position. Corner compartments 134 include light assemblies 132 that illuminate an area external to cargo system 100, for example to aid in unloading cargo at night. Light assemblies 132 optionally are mounted on cargo system 100 in a manner that allows assemblies 132 to swivel with respect to cargo system 100, thereby illuminating different areas around cargo system 100 for example to aid in locating a vacation site.

In an exemplary embodiment, light assemblies 132 are additionally included in compartments 120, 122 and/or 124 and are designed to provide light internal to and/or external to compartment 134, 120, 122 and/or 124. Light assemblies 132 include one or more illuminating sources, for example incandescent bulbs and/or halogen bulbs and optionally include one or more signal lights that flash a hazard signal that can be observed a distance from cargo system 100.

Power to light assemblies 132 is provided through a power receptacle 176 located on an external surface 112 of cargo system 100 to which light assemblies 132 are connected. An electrical conductor 144, for example a wire, connects power receptacle 176 to a power source (not shown), for example inside vehicle 180. Alternatively or additionally, a solar panel (not shown) located on external surface 112, provides power lo light assemblies 132 via conductor 144.

Cargo System Dimensions

In an exemplary embodiment, cargo system 100 is manufactured with a length and width that readily fits on roof 182. Cargo system 100, for example, has a length of 2.2 meters, and a width of 1.2 meters. Alternatively or additionally, cargo system 100 is manufactured with more elongate and/or wider dimensions for a passenger van having larger sized roof 182 or shorter and/or narrower dimensions for a vehicle having smaller sized roof 182. Alternatively or additionally, cargo system 100 is manufactured with larger dimensions for use, for example, on the roof of a mid-sized camping vehicle and/or a full-sized recreational vehicle roof, for example, built on a bus chassis.

In an exemplary embodiment., cargo system 100 is manufactured with a height dimension of 20 centimeters, allowing ample room for storage of awning 130 and suspension of container 150 in compartment 124. Additionally or alternatively cargo system 100 is manufactured with a height of less than 20 centimeters, for example when compartment 124 is contains either awning 130 or container 150 but not both awning 130 and container 150. Additionally or alternatively cargo system 100 is manufactured with a height greater than 20 centimeters, for example to accommodate cargo stored in addition to awning 130 and container 150 in compartment 124.

The present invention has been described using non-limiting detailed descriptions of embodiments thereof that are provided by way of example and are not intended to limit the scope of the invention. It should be understood that features and/or steps described With respect to one embodiment may be used with other embodiments and that not all embodiments of the invention have all of the features and/or steps shown in a particular figure or described with respect to one of the embodiments. Variations of embodiments described will occur to persons of the art.

Furthermore, the terms "include", "comprise," "have" and their conjugates, shall mean, when used in the disclosure and/or claims, "comprising but not necessarily limited to."

It is noted that some of the above described embodiments may describe the best mode contemplated by the inventors and therefore may comprise structure, acts or details of structures and acts that may not be essential to the invention and which are described as examples. Structure and acts described herein are replaceable by equivalents, which perform the same function, even if the structure or acts are different, as known in the art.

Therefore, the scope of the invention is limited only by the elements and limitations as used in the claims.

What is claimed is:

1. A cargo system, comprising:
a plurality of rigidly connected compartments adapted to mount on the roof of a vehicle, said plurality of compartments including:
a first compartment suitable for mounting a retractable awning therein; and
a second compartment suitable for storing cargo;
wherein one of said plurality of compartments further includes a liquid container having two portions:
a first container portion connected to said one of said compartments; and
a second container portion suspended within said one of said compartments.

2. The cargo system of claim 1, further comprising a flooring, said first and second compartments being rigidly connected via said flooring.

3. The cargo system of claim 1 further comprising an access panel operatively associated with one of said plurality of compartments.

4. The cargo system of claim 1 further comprising a tube suitable for passing liquid, said tube being connected to said liquid container and emerging from the cargo system.

5. The cargo system of claim 4, comprising a plurality of said tubes, and wherein:
a first of said plurality of tubes is suitable for input of liquid; and
a second of said plurality of tubes is suitable for dispensing of liquid.

6. The cargo system of claim 1, wherein said first compartment is spaced a distance from said second compartment, thereby defining a third compartment therebetween.

7. The cargo system of claim 6 further comprising a light assembly operatively associated with one of said first, second and third compartments.

8. The cargo system of claim 7 wherein said light assembly further includes an electrical conductor suitable for providing power to said light assembly, said conductor emerging from the cargo system.

9. A cargo system adapted to mount on a vehicle roof, the cargo system comprising a first compartment including a liquid container having two portions:
a first container portion connected to said first compartment; and
a second container portion suspended within said first compartment;
further comprising a tube suitable for passing liquid, said tube being connected to said liquid container and emerging from the cargo system.

10. The cargo system of claim 9, comprising a plurality of said tubes, and wherein:
a first of said plurality of tubes is suitable for input of liquid; and
a second of said plurality of tubes is suitable for dispensing of liquid.

11. The cargo system of claim 9 including a second compartment rigidly attached to said first compartment.

12. The cargo system of claim 11 further comprising a light assembly operatively associated with one of said first and second compartments.

13. The cargo system of claim 12 wherein said light assembly further includes an electrical conductor suitable for providing power to said light assembly, said conductor emerging from the cargo system.

14. The cargo system of claim 11 wherein one of said first and second compartments is adapted for mounting a retractable awning therein.

15. The cargo system of claim 11, wherein said first compartment is spaced a distance from said second compartment, thereby defining a third compartment therebetween.

16. A method of enhancing the utility of a vehicle the method comprising the steps of:
attaching a first compartment to a roof of the vehicle;
placing a retractable awning in the first compartment; and rigidly attaching a second compartment to the first compartment.

17. The method of claim 16, further including the step of operationally associating a light assembly with one of said first and second compartments.

18. The method of claim 16, further including suspending a liquid container in one of said first and second compartments.

* * * * *